(12) United States Patent
Takahashi

(10) Patent No.: US 8,237,976 B2
(45) Date of Patent: Aug. 7, 2012

(54) IMAGE PROCESSING DEVICE AND SYSTEM, AND COMPUTER READABLE MEDIUM THEREFOR

(75) Inventor: Yusaku Takahashi, Aichi (JP)

(73) Assignee: Brother Kogyo Kabushiki Kaisha, Aichi (JP)

(*) Notice: Subject to any disclaimer, the term of this patent is extended or adjusted under 35 U.S.C. 154(b) by 310 days.

(21) Appl. No.: 12/711,700

(22) Filed: Feb. 24, 2010

(65) Prior Publication Data

US 2010/0214584 A1 Aug. 26, 2010

(30) Foreign Application Priority Data

Feb. 26, 2009 (JP) ................... 2009-043466

(51) Int. Cl.
*G06K 15/00* (2006.01)
*H04N 1/46* (2006.01)
(52) U.S. Cl. .................. 358/1.16; 358/540; 382/284
(58) Field of Classification Search .................. None
See application file for complete search history.

(56) References Cited

U.S. PATENT DOCUMENTS

| | | | |
|---|---|---|---|
| 4,807,287 A | 2/1989 | Tucker et al. | |
| 5,745,664 A | 4/1998 | Nomura et al. | |
| 7,840,092 B2 | 11/2010 | Sato et al. | |
| 2003/0068099 A1* | 4/2003 | Chao et al. | 382/282 |
| 2003/0160977 A1* | 8/2003 | Nishikawa et al. | 358/1.2 |
| 2003/0202193 A1* | 10/2003 | Yokochi | 358/1.9 |
| 2007/0091373 A1 | 4/2007 | Sato et al. | |
| 2010/0214584 A1 | 8/2010 | Takahashi | |

FOREIGN PATENT DOCUMENTS

| | | |
|---|---|---|
| JP | 5-81266 | 4/1993 |
| JP | 8-289132 | 11/1996 |
| JP | 2001-56857 | 2/2001 |
| JP | 2001-76127 | 3/2001 |
| JP | 2006-114971 | 4/2006 |
| JP | 2006-135819 | 5/2006 |
| JP | 2007-49518 | 2/2007 |
| JP | 2007-116469 | 5/2007 |
| JP | 2010-200070 | 9/2010 |

OTHER PUBLICATIONS

Decision to Grant a Patent dated Jan. 24, 2012 received from the Japanese Patent Office from related Japanese Application No. 2009-289047 and U.S. Appl. No. 12/894,714, together with a partial English-language translation.

* cited by examiner

*Primary Examiner* — James A Thompson
(74) *Attorney, Agent, or Firm* — Scully, Scott, Murphy & Presser, PC

(57) ABSTRACT

An image processing device is configured to detect allocation areas from template data, specify a position of each detected allocation area on the template data with respect to a first standard, provide an area identification to each allocation area based on the specified position of each allocation area, acquire image data based on document sheets set thereon, extract document images from the acquired image data, specify a location of each extracted document image on the acquired image data with respect to a second standard, provide an image identification to each document image based on the specified location of each document image, identify an allocation area corresponding to each document image based on the image identifications and the area identifications, edit each document image to be allocated in the corresponding allocation area, generate composite data with the edited document images allocated in the respective allocation areas, and output the composite data.

13 Claims, 9 Drawing Sheets

IMAGE PROCESSING DEVICE AND SYSTEM, AND COMPUTER READABLE MEDIUM THEREFOR

CROSS-REFERENCE TO RELATED APPLICATION

This application claims priority under 35 U.S.C. §119 from Japanese Patent Application No. 2009-043466 filed on Feb. 26, 2009. The entire subject matter of the application is incorporated herein by reference.

BACKGROUND

1. Technical Field

The following description relates to one or more image processing techniques for generating and outputting composite image data.

2. Related Art

An image processing device has been known which provides a user with composite image data on which images based on a plurality of document sheets are allocated in predetermined areas designated by the user. More specifically, the image processing device reads the plurality of document sheets on a page-by-page basis, and combines the images based on the read document sheets to be allocated in the user-designated areas.

SUMMARY

According to such an image processing device, when combining the images based on the plurality of document sheets into a single piece of data, the user has to perform operations of "reading a document sheet" and "designating an area where a read image is to be allocated" for each of the document sheets. Namely, the above technique requires the user to perform the troublesome operations for each of the document sheets.

Aspects of the present invention are advantageous to provide one or more improved techniques that make it possible to obtain, in a user-friendly manner, a single piece of output data that has images based on a plurality of document sheets combined therein.

According to aspects of the present invention, an image processing device is provided which is configured to generate and output composite data in which two or more document images are combined. The image processing device includes an area detecting unit configured to detect allocation areas from template data that defines the allocation areas where the document images are to be allocated on the composite data, respectively, an area position specifying unit configured to specify a position of each of the detected allocation areas with respect to a first standard for defining a position on the template data, an area identification providing unit configured to provide an area identification to each of the allocation areas based on the specified position of each of the allocation areas, an image acquiring unit configured to acquire image data based on document sheets set thereon on which the document images to be combined are formed, an image extracting unit configured to extract the document images from the acquired image data, an image location specifying unit configured to specify a location of each of the extracted document images with respect to a second standard for defining a location on the acquired image data, an image identification providing unit configured to provide an image identification to each of the document images based on the specified location of each of the document images, an allocation area identifying unit configured to identify an allocation area corresponding to each of the document images based on the image identifications and the area identifications, an image editing unit configured to edit each of the document images so as to be allocated in the corresponding one of the allocation areas that is identified by the allocation area identifying unit, a composite data generating unit configured to generate the composite data in which the edited document images are allocated in the respective allocation areas, and an output unit configured to output the composite data generated by the composite data generating unit.

In some aspects of the present invention, the image processing device configured as above makes it possible to reduce a burden placed on a user to obtain output data with document images based on a plurality of document sheets combined therein. Further, the image processing device can present output data in which the document images are combined in a user-desired manner when the user sets the plurality of document sheets in consideration of the first standard and the second standard.

According to aspects of the present invention, further provided is an image processing system configured to generate and output composite data in which two or more document images are combined. The image processing system includes an area detecting unit configured to detect allocation areas from template data that defines the allocation areas where the document images are to be allocated on the composite data, respectively, an area position specifying unit configured to specify a position of each of the detected allocation areas with respect to a first standard for defining a position on the template data, an area identification providing unit configured to provide an area identification to each of the allocation areas based on the specified position of each of the allocation areas, an image acquiring unit configured to acquire image data based on document sheets set thereon on which the document images to be combined are formed, an image extracting unit configured to extract the document images from the acquired image data, an image location specifying unit configured to specify a location of each of the extracted document images with respect to a second standard for defining a location on the acquired image data, an image identification providing unit configured to provide an image identification to each of the document images based on the specified location of each of the document images, an allocation area identifying unit configured to identify an allocation area corresponding to each of the document images based on the image identifications and the area identifications, an image editing unit configured to edit each of the document images so as to be allocated in the corresponding one of the allocation areas that is identified by the allocation area identifying unit, a composite data generating unit configured to generate the composite data in which the edited document images are allocated in the respective allocation areas, and an output unit configured to output the composite data generated by the composite data generating unit.

In some aspects of the present invention, the image processing system configured as above can provide the same effects as the aforementioned image processing device.

According to aspects of the present invention, further provided is a computer readable medium having computer readable instructions stored thereon for generating and outputting composite data in which two or more document images are combined. The instructions, when executed by a processor having an image acquiring unit, cause the processor to perform an area detecting step of detecting allocation areas from template data that defines the allocation areas where the document images are to be allocated on the composite data, respectively, an area position specifying step of specifying a position of each of the detected allocation areas with respect to a first standard for defining a position on the template data, an area identification providing step of providing an area identification to each of the allocation areas based on the specified position of each of the allocation areas, an image acquiring step of acquiring image data based on document sheets set on the image acquiring unit, the document sheets having thereon the document images to be combined, an image extracting step of extracting the document images from the acquired image data, an image location specifying step of specifying a location of each of the extracted document images with respect to a second standard for defining a location on the acquired image data, an image identification providing step of providing an image identification to each of the document images based on the specified location of each of the document images, an allocation area identifying step of identifying an allocation area corresponding to each of the document images based on the image identifications and the area identifications, an image editing step of editing each of the document images so as to be allocated in the corresponding one of the allocation areas that is identified in the allocation area identifying step, a composite data generating step of generating the composite data in which the edited document images are allocated in the respective allocation areas, and an output step of outputting the composite data generated in the composite data generating step.

In some aspects of the present invention, the computer readable medium configured as above can provide the same effects as the aforementioned image processing device.

BRIEF DESCRIPTION OF THE ACCOMPANYING DRAWINGS

FIG. 1 schematically shows a configuration of a printing system according to one or more aspects of the present invention.

Figure 5:
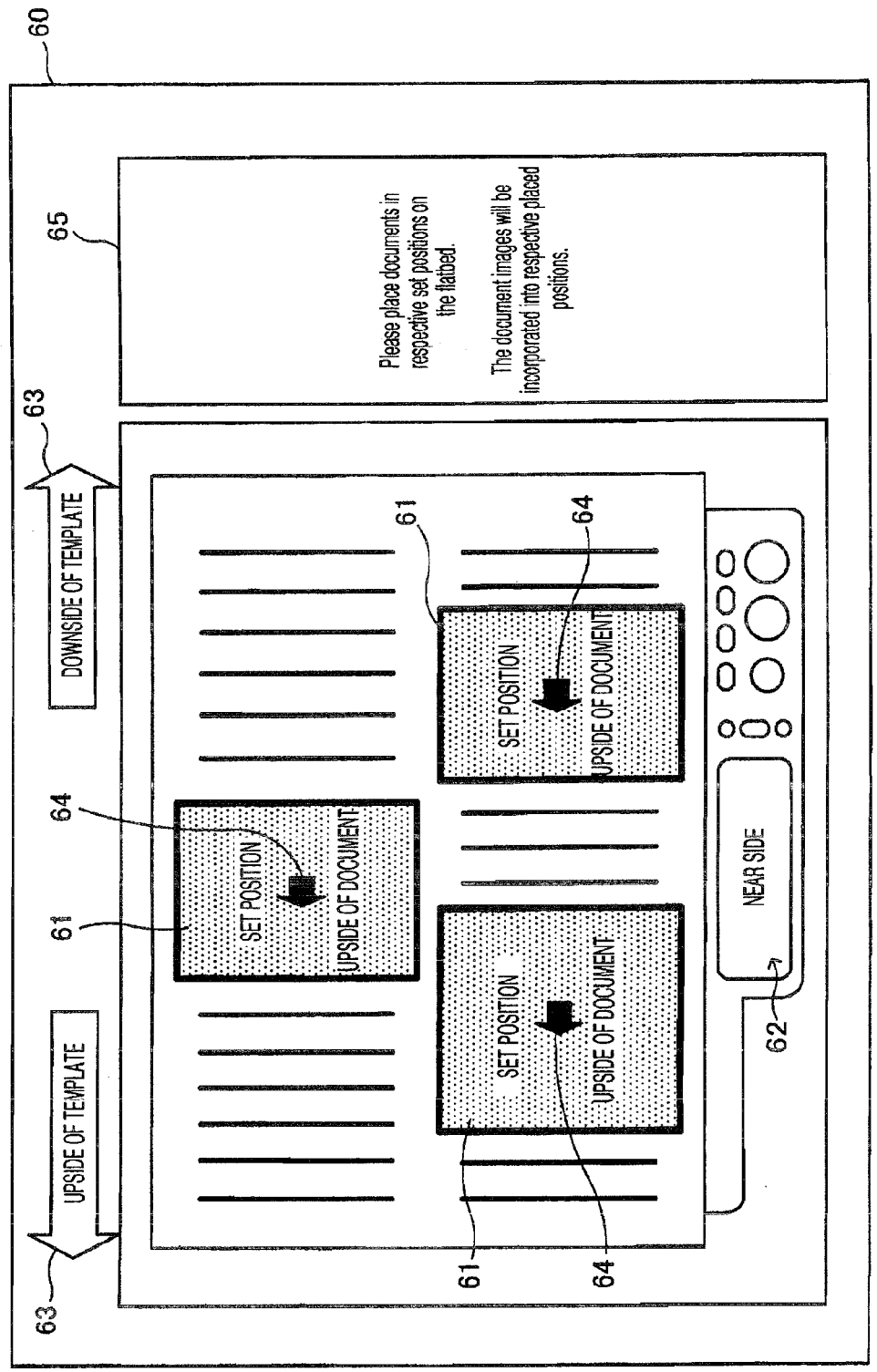
Figure 6:
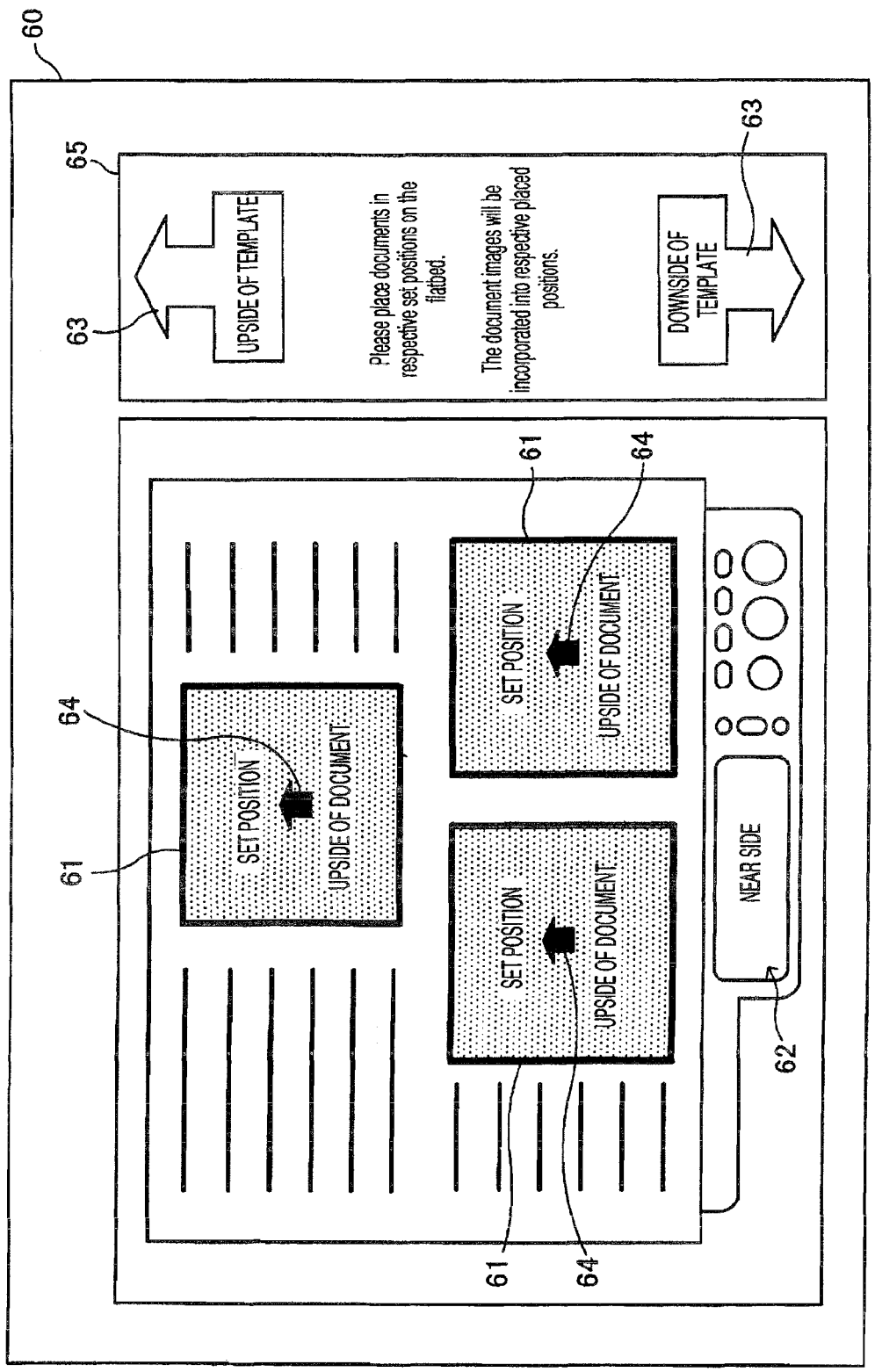

FIGS. 5 and 6 exemplify document set guide screens according to one or more aspects of the present invention.

Figure 7:
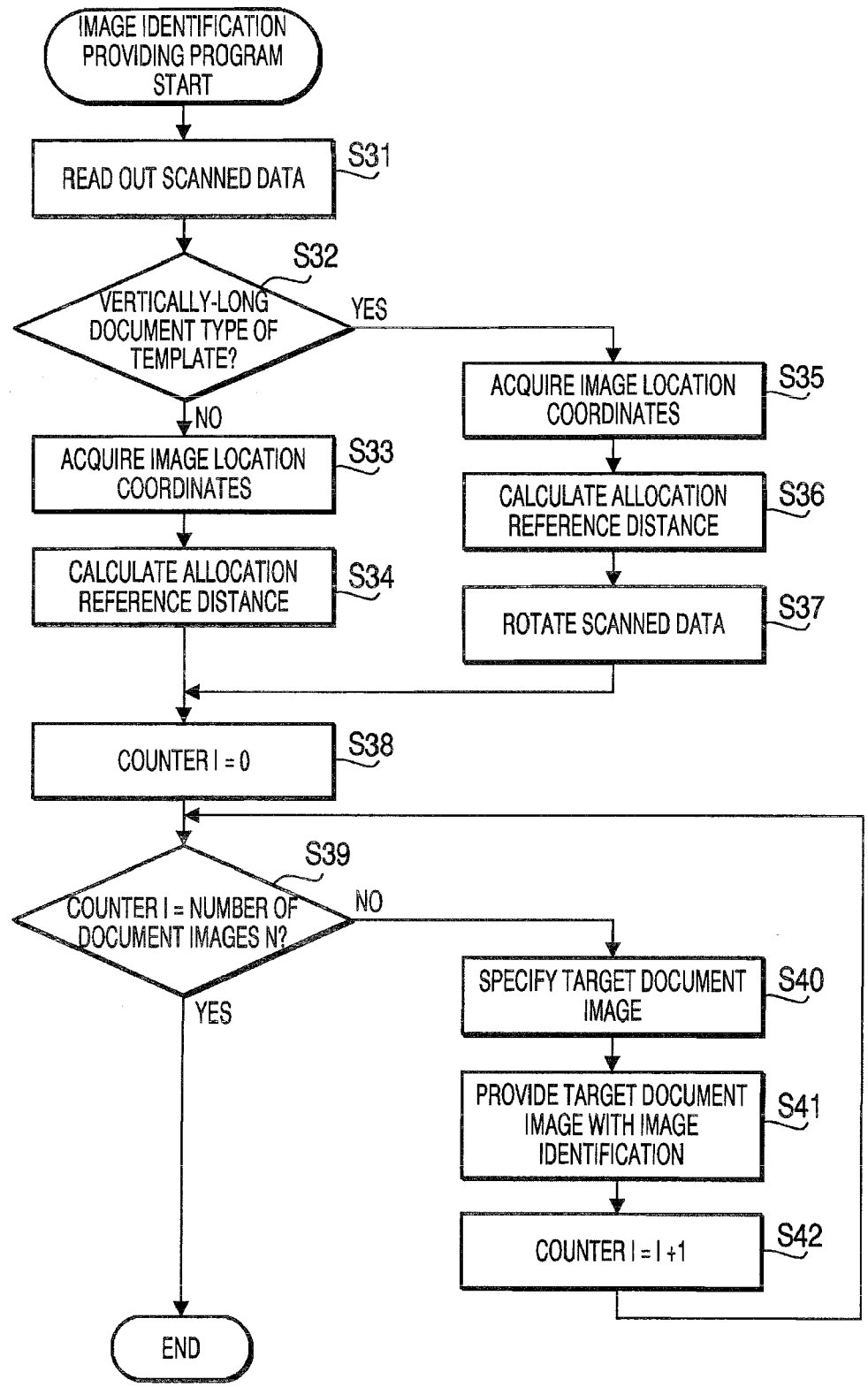

FIG. 7 is a flowchart showing a procedure of an image identification providing program according to one or more aspects of the present invention.

Figure 8:
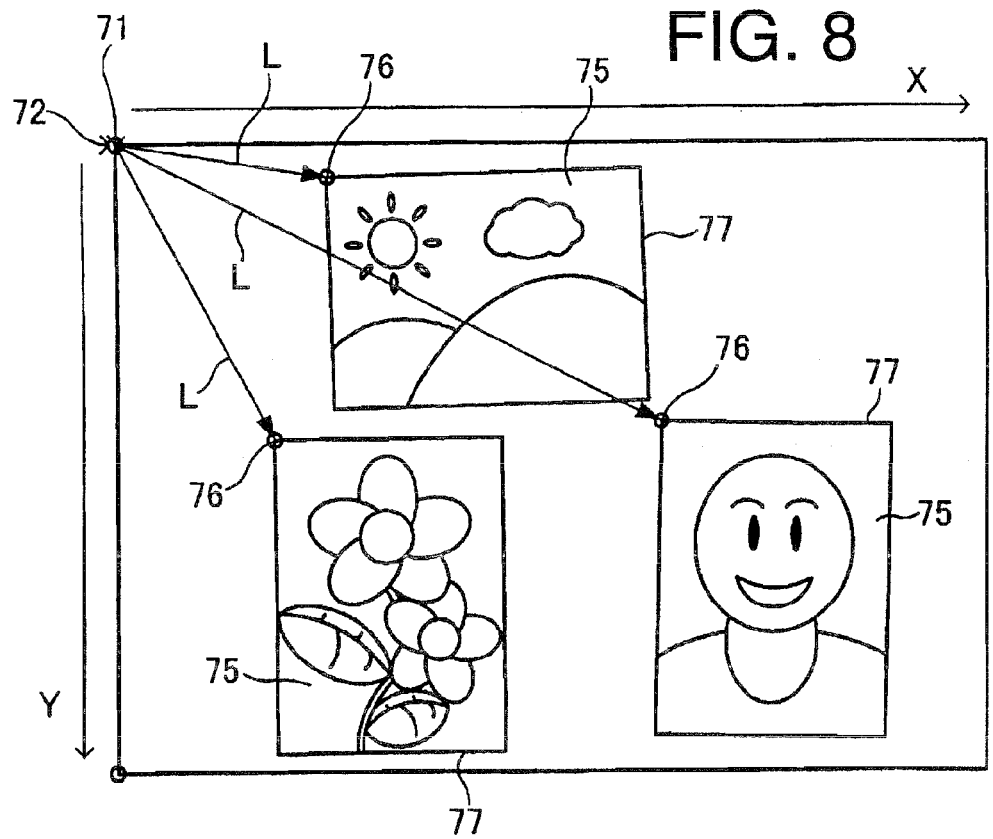
Figure 9:
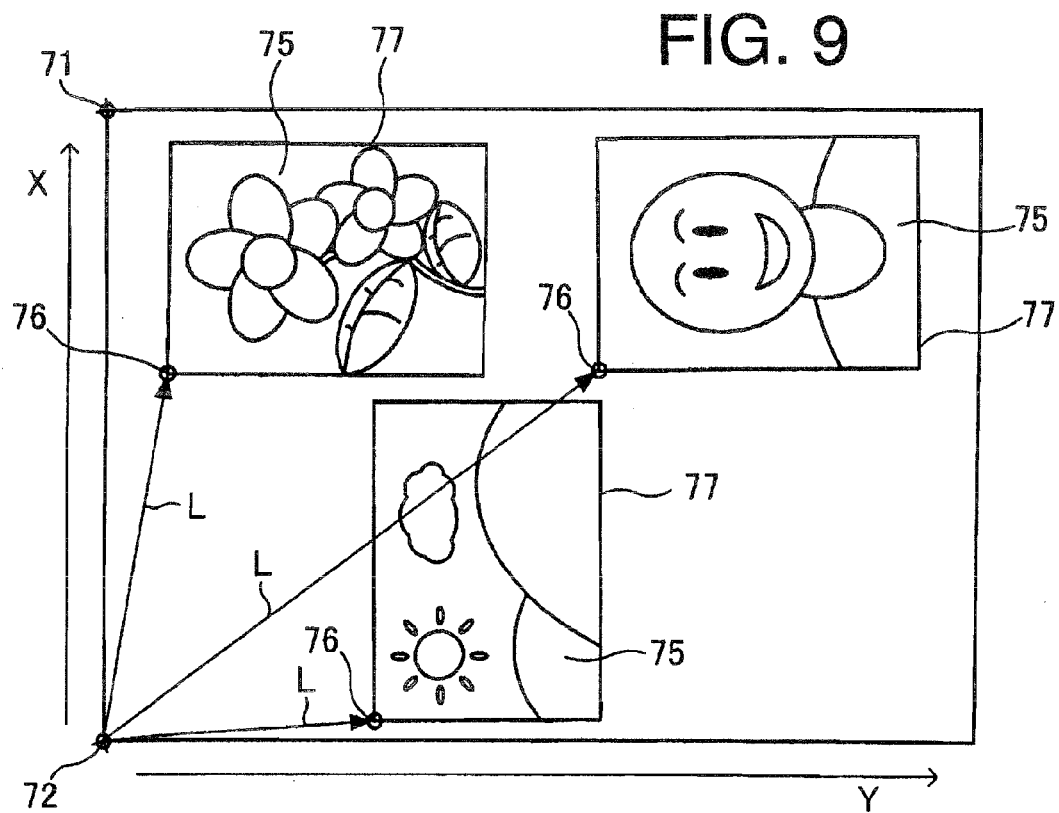

FIGS. 8 and 9 exemplify scanned data to set forth a process of providing image identifications according to one or more aspects of the present invention.

Figure 10:
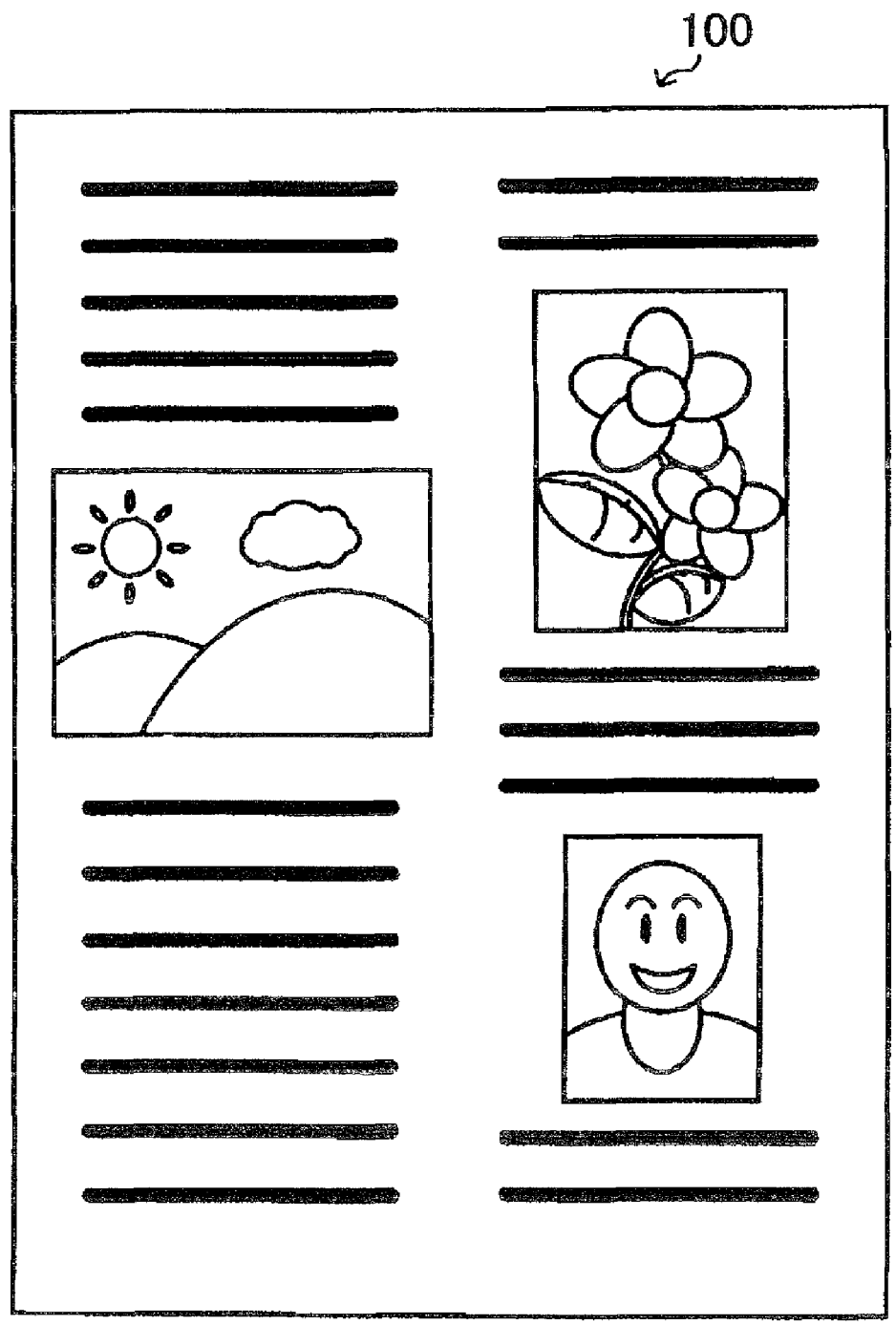

FIG. 10 exemplifies composite data to be output according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

First Embodiment

Figure 1:
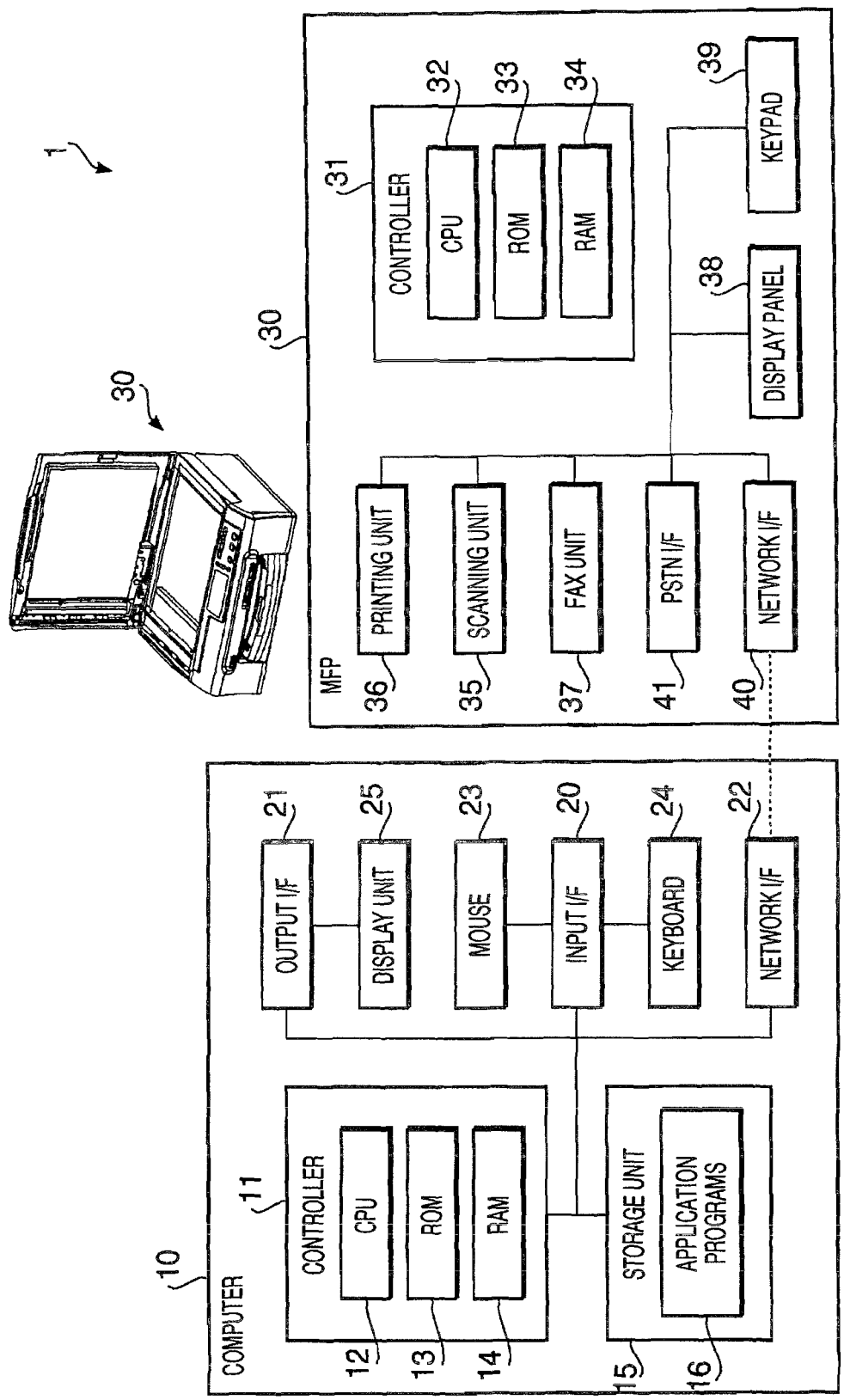

As illustrated in FIG. 1, a printing system 1 of a first embodiment is configured with a computer 10 and a multifunction peripheral (MFP) 30. The computer 10 is connected with the MFP 30 so as to exchange data (e.g., scanned data 70) therebetween.

Initially, a detailed explanation will be provided about a configuration of the computer 10 with reference to FIG. 1. As shown in FIG. 1, the computer 10 includes a controller 11.

The controller 11 is configured with a CPU 12, a ROM 13, and a RAM 14. The CPU 12 is a central processing unit configured to take overall control of the computer 10. The ROM 13 stores data and control programs required for controlling the computer 10. The RAM 14 is configured to temporarily store results of arithmetic operations performed by the CPU 12 using the control programs.

The computer 10 is provided with a storage unit (e.g., an HDD) 15. The storage unit 15 is connected with the controller 11. The storage unit 15 stores application programs 16. The application programs 16 contain a below-mentioned control program (see FIG. 2), a document creating program, and a spread sheet program.

Further, the computer 10 has a mouse 23, a keyboard 24, and a display unit 25. The mouse 23 and the keyboard 24 are linked with the controller 11 via an input interface (I/F) 20. Hence, a user can cause the controller 11 to perform a desired process by operating the mouse 23 and/or the keyboard 24.

The display unit 25 is connected with the controller 11 via an output I/F 21. Accordingly, the display unit 25 can display thereon various kinds of screen images on the basis of control by the controller 11.

In addition, the computer 10 is provided with a network I/F 22. The computer 10 is connected with the MFP 30 via the network I/F 22. The network I/F 22 is configured to take control of data communication between the computer 10 and the MFP 30.

Subsequently, a detailed explanation will be provided about a configuration of the MFP 30 with reference to FIG. 1. The MFP 30 has a controller 31. The controller 31 is configured with a CPU 32, a ROM 33, and a RAM 34. The CPU 32 is a central processing unit configured to take overall control of the MFP 30. The ROM 33 stores data and programs required for controlling the MFP 30. The RAM 34 is configured to temporarily store results of arithmetic operations performed by the CPU 32 using the programs.

The MFP 30 is provided with a scanning unit 35, a printing unit 36, and a facsimile unit 37. As can be understood from an external view of the MFP 30 shown in FIG. 1, the scanning unit 35 has a flatbed and a carriage.

The flatbed is configured with optically-transparent material (e.g., glass). On the flatbed, a document sheet is placed. In addition, the flatbed has such a size that an A3-sized sheet can be placed thereon. Thus, the user can place a plurality of document sheets simultaneously on the flatbed.

The carriage has a light source configured to emit light to a document sheet placed on the flatbed. The light, emitted by the light source of the carriage, is reflected by the document sheet on the flatbed, and used for taking an image with an imaging device. The imaging device has a plurality of image pickup elements (e.g., CCDs), and constitutes the scanning unit 35.

Accordingly, when a plurality of document sheets are placed on the flatbed, the MFP 30 controls the scanning unit 35 to acquire scanned data 70 as shown in FIGS. 8 and 9. The scanned data 70 contains a plurality of document images 75 based on the document sheets on the flatbed.

The printing unit 36 is configured to print an image based on input print data on a sheet under control by the controller 31.

The facsimile unit 37 is configured to perform facsimile transmission to a predetermined destination device under control by the controller 31.

The MFP 30 is provided with a display panel 38 and a keypad 39. The display panel 38 is configured to display various kinds of information under control by the controller 31. The keypad 39 is used for various operations by the user.

Further, the MFP 30 includes a network I/F 40, and a PSTN I/F 41. The network I/F 40 is employed for data communication between the MFP 30 and the computer 10. The PSTN I/F 41 is used for telephone communication via a public switched telephone line network.

Next, a control program will be set forth with reference to a flowchart in FIG. 2, which shows a procedure of the control program to be executed by the controller 11.

The following description will be provided under an assumption that template data 50 has already been set as data to be processed. The template data 50 can be created using a corresponding one of the application programs 16 (e.g., the document creating program). In this case, while creating a text, the user secures areas (allocation areas 55), on a single page, where the user wishes to allocate data of other document sheets, using rectangular graphics (see FIG. 4). Thus, when a printed sheet is output on which data of a plurality of document sheets is incorporated, the template data 50 has a plurality of allocation areas 55.

In S1, the controller 11 detects allocation areas 55 in the template data 50 as set (S1). Specifically, based on an orthogonal coordinate system with a left upper end of the template data 50 defined as a template origin 51, the controller 11 detects allocation areas 55 in the template data 50. Then, after detection of the allocation areas 55, the controller 11 stores, onto the RAM 14, positional information that indicates positions of the allocation areas 55 on the template data 50.

Figure 4:
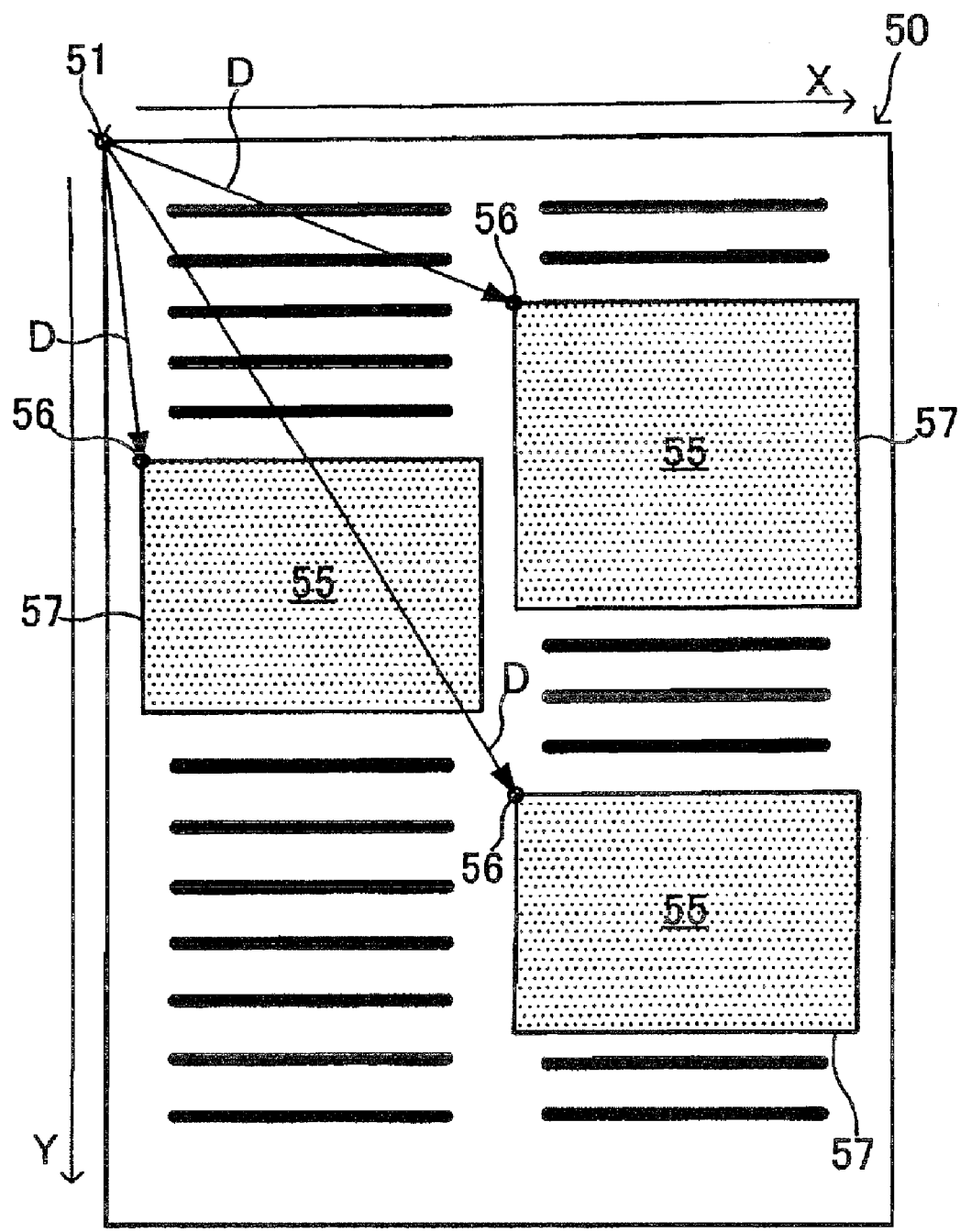
FIG. 4 is an illustration for schematically showing template data and setting forth a process of providing area identifications according to one or more aspects of the present invention.

As illustrated in FIG. 4, the template data 50 has a plurality of allocation areas 55 secured by rectangular graphics. Each side of each rectangular graphic used for securing the allocation areas 55 constitutes an area boundary 57. Thus, by detecting the area boundaries 57, it is possible to detect the allocation areas 55 in the template data 50.

Further, as shown in FIG. 4, the orthogonal coordinate system of the template data 50 is defined by an X-axis that extends horizontally in the right direction from the template origin 51 and a Y-axis that extends vertically downward from the template origin 51. Each of the rectangular allocation areas 55 has area reference coordinates 56, which are coordinates of a left upper end of a corresponding allocation area 55 in the orthogonal coordinate system of the template data 50. Namely, the area reference coordinates 56 represent a position of the corresponding allocation area 55. Information on the area reference coordinates 56 is contained in the positional information stored in S1. In addition, the positional information contains information on shapes and sizes of the allocation areas 55 as well.

Figure 3:
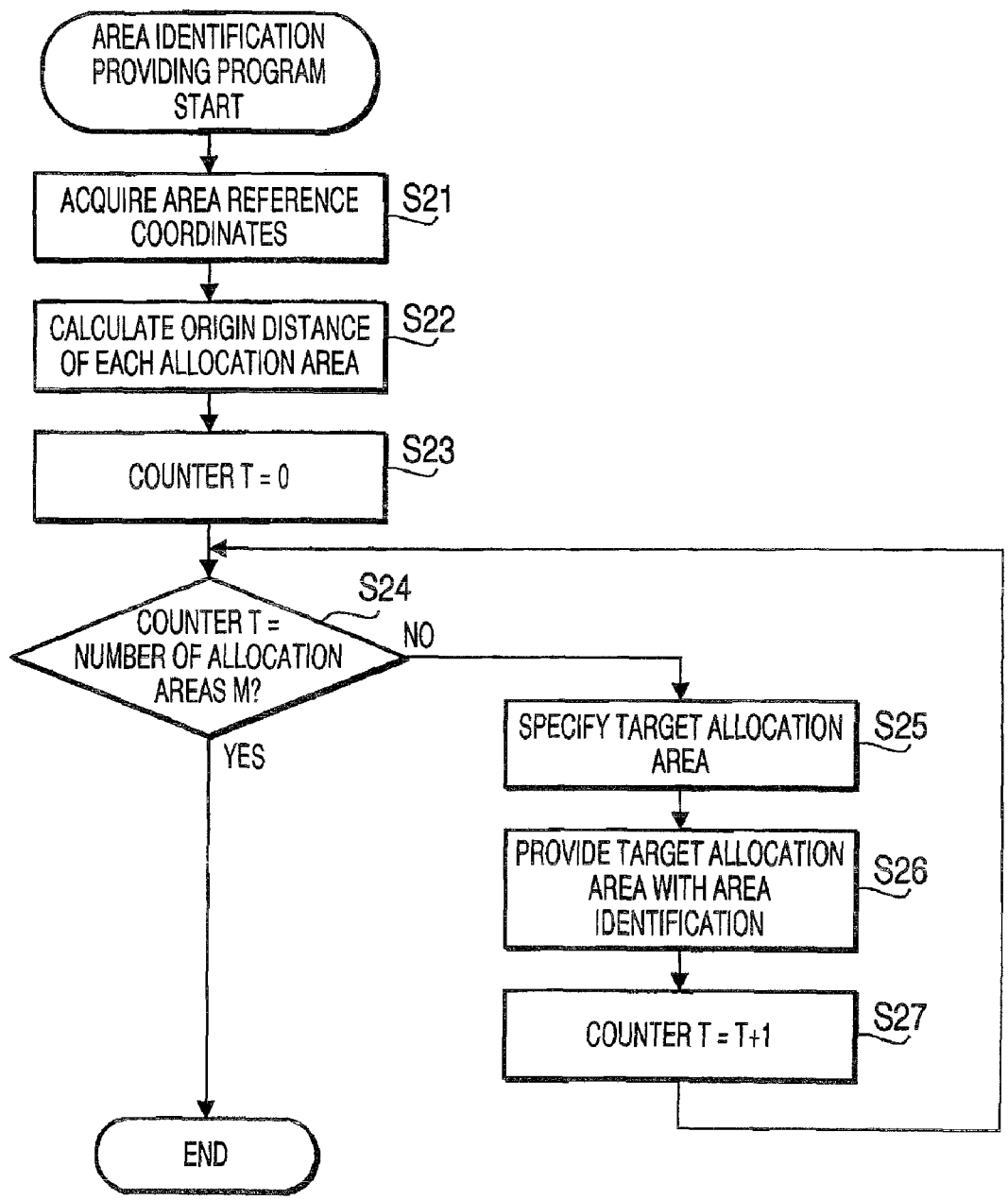
FIG. 3 is a flowchart showing a procedure of an area identification providing program according to one or more aspects of the present invention.

In S2, the controller 11 executes an area identification providing program (see FIG. 3) to provide an area identification to each of the detected allocation areas 55 (S2). The area identification providing program will be described in detail below with reference to FIG. 3.

In the area identification providing program, the controller 11 initially acquires the area reference coordinates 56 of each of the allocation areas 55 that exist in the template data 50 (S21). Specifically, the controller 11 reads the positional information of each of the allocation areas 55 out of the RAM 14, and acquires the area reference coordinates 56 of each of the allocation areas 55.

Subsequently, the controller 11 calculates an origin distance D of each of the allocation areas 55 (S22). Specifically, the controller 11 calculates the origin distance D based on the area reference coordinates 56 of each of the allocation areas 55 and the coordinates of the template origin 51, and stores onto the RAM 14 information representing the origin distance D of each of the allocation areas 55. It is noted that the origin distance D is defined as a distance from the template origin 51 to the area reference coordinates 56 of a corresponding allocation area 55.

Next, the controller 11 sets a value of a counter T to zero (S23). It is noted that the value of the counter T indicates the number of the allocation areas 55 with the respective area identifications provided thereto.

Thereafter, the controller 11 determines whether the value of the counter T has become equal to the number of the allocation areas M (S24). Specifically, the controller 11 determines whether the area identification is provided to every allocation area 55 in the template data 50. When determining that the value of the counter T has become equal to the number of the allocation areas M (S24: Yes), the controller 11 terminates the area identification providing program. Meanwhile, when determining that the value of the counter T has not become equal to the number of the allocation areas M (S24: No), the controller 11 goes to S25.

In S25, the controller 11 specifies a target allocation area from the allocation areas 55 included in the template data 50 (S25). The target allocation area denotes a target one, of the allocation areas 55, to which the area identification is to be provided.

Specifically, the controller 11 reads, out of the RAM 14, the origin distances D of allocation areas 55 to which the area identifications have not yet been provided, and identifies, as a target allocation area, an allocation area 55 associated with the shortest origin distance D.

In the example shown in FIG. 4, a first allocation area (i.e., the allocation area 55 placed in a left middle position of the template data 50), which has the shortest origin distance D, is specified as a target allocation area. Further, in the later-executed steps S25, the controller 11 sequentially identifies, as target allocation areas, a second allocation area and a third allocation area in the cited order based on the lengths of the origin distances D of the other allocation areas 55. It is noted that the second allocation area is the allocation area 55 placed in a right upper position of the template data 50 in FIG. 4. The third allocation area is the allocation area is the allocation area 55 placed in a right lower position of the template data 50 in FIG. 4.

When there are a plurality of allocation areas 55 that have an identical origin distance D, the controller 11 identifies, as a target allocation area, one of the plural allocation areas 55 that has the smallest X-coordinate of the area reference coordinates 56. Further, when there are a plurality of allocation areas 55 that have an identical origin distance D and an identical X-coordinate of the area reference coordinates 56, the controller 11 identifies, as a target allocation area, one of the plural allocation areas 55 that has the smallest Y-coordinate of the area reference coordinates 56.

In S26, the controller 11 provides the target allocation area with a corresponding area identification (S26). The area identifications are sequentially provided as identification numbers in the order from "1."

In the example shown in FIG. 4, in S26, the controller 11 provides the first allocation area with the area identification of "the identification number: 1." In the later-executed steps S26, the controller 11 provides the second allocation area with the area identification of "the identification number: 2," and provides the third allocation area with the area identification of "the identification number: 3."

In S27, the controller 11 increments the value of the counter T by one (S27). Thereafter, the controller 11 goes back to S24 to provide unprocessed allocation areas 55 with the respective area identifications.

Figure 2:
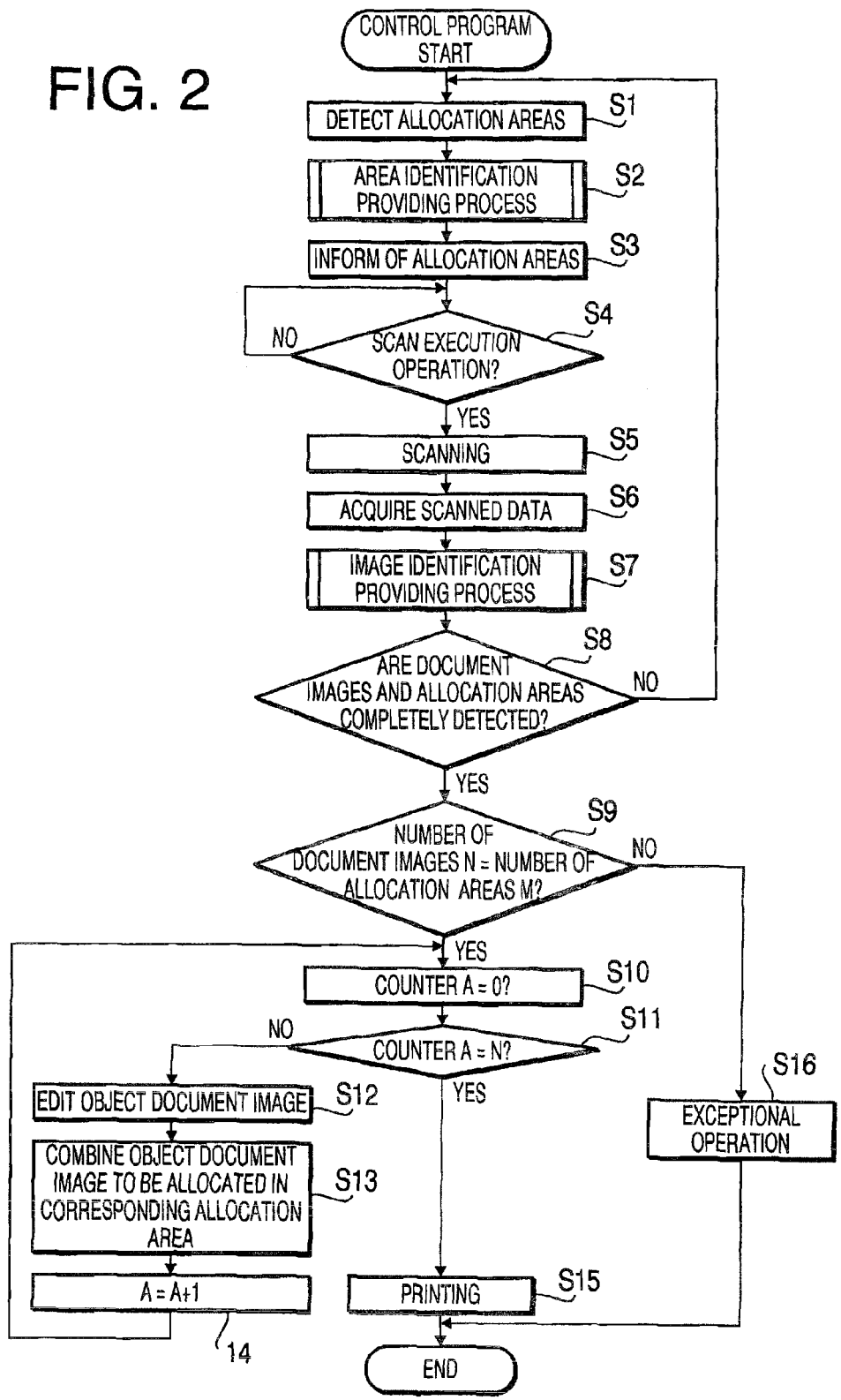
FIG. 2 is a flowchart showing a procedure of a control program according to one or more aspects of the present invention.

As illustrated in FIG. 2, after providing all of the allocation areas 55 in the template data 50 with the respective area identifications in S2, the controller 11 displays a document set guide screen 60 on the display unit 25 (S3).

A detailed explanation will be given about the document set guide screen 60 to be displayed on the display unit 25 with reference to the relevant figures. FIGS. 5 and 6 exemplify document set guide screens 60.

As illustrated in each of FIGS. 5 and 6, the document set guide screen 60 includes one or more set position informing images 61, a display orientation informing image 62, template orientation informing images 63, one or more set orientation informing images 64, and a message display portion 65.

Each set position informing image 61 indicates a set position of a document sheet that the user wishes to allocate in a corresponding allocation area 55. The set position means a position where the document sheet is to be set on the flatbed of the scanning unit 35. The set position informing image 61 is created based on the template data 50 and the positional information of each allocation area 55 stored in S1.

In addition, each set position informing image 61 is displayed with a thick boarder line, and the inner area therein is shown with a color different from colors for the other regions on the document set guide screen 60 (see FIGS. 5 and 6). Accordingly, the user can exactly grasp the set position corresponding to each of the allocation areas 55 in the template data 55, based on the document set guide screen 60.

The display orientation informing image 62 indicates a positional relationship between a flatbed schematically shown on the document set guide screen 60 and the actual flatbed of the MFP 30. Specifically, on the document set guide screen 60, characters "Near Side" is shown in a position corresponding to the display panel 38 of the MFP 30. Thereby, the user can exactly grasp the positional relationship of information on the document set guide screen 60 with the actual MFP 30.

The template orientation informing images 63 indicate the upside/downside of the template data 50. The template orientation informing images 63 are generated based on format information included in the template data 50. Thereby, the user can grasp the upside/downside directions of the template data 50 based on the template orientation informing images 63. Thus, the user can acquire a desired output result as exactly understanding a relationship between an orientation of a document sheet to be set on the flatbed and the orientation of the template data 50.

Each set orientation informing image 64 indicates the upside of a corresponding document sheet to be set in a set position. A direction indicated by each set orientation informing image 64 is consistent with directions indicated by the template orientation informing images 63. Thus, the user can acquire a desired output result as exactly grasping a relationship between an orientation of a corresponding document sheet to be set in each set position and the orientation of the template data 50.

The message display portion 65 displays a message that the user should set a desired document sheet in a set position indicated by each set position informing image 61. In addition, the message display portion 65 displays a message that data of the document sheets set in the respective set positions is to be incorporated in the respective allocation areas 55.

The template data 50 is classified into two types, i.e., a vertically-long document type and a horizontally-long document type. The vertically-long document type of template data 50 is template data 50 to be output on a sheet (e.g., an A4-sized sheet) with longer sides thereof oriented in an up-down direction of output data. Meanwhile, the horizontally-long document type of template data 50 is template data 50 to be output on a sheet with shorter sides thereof oriented in an up-down direction of output data.

In S3, the controller 11 determines based on the format information of the template data 50 whether the template data 50 is of the vertically-long document type or the horizontally-long document type. Then, as shown in FIGS. 5 and 6, the controller 11 changes a display manner in which the document set guide screen 60 is displayed, depending on the type of the template data 50.

Specifically, the controller 11 changes display manners (e.g., display positions and display information) in which the template orientation informing images 63 and the set orientation informing images 64 are displayed (see FIGS. 5 and 6), depending on the type (the vertically-long document type or the horizontally-long document type) of the template data 50. Thus, the user can exactly acquire an output printed in a desired manner by setting document sheets in the respective set positions in accordance with the information provided by the template orientation informing images 63 and the set orientation informing images 64.

In response to the document set guide screen 60 being displayed in S3, the user sets a plurality of document sheets on the scanning unit 35 while confirming the information displayed on the document set guide screen 60.

In S4, the controller 11 determines whether a scan execution operation has been performed to start a scanning operation (S4). The scan execution operation may be performed, for instance, through the keyboard 24. When determining that the scan execution operation has been performed (S4: Yes), the controller 11 goes to S5. Meanwhile, when determining that the scan execution operation has not been performed (S4: No), the controller 11 waits for the scan execution operation to be performed.

In S5, the controller 11 instructs the controller 31 of the NWT 30 to scan the document sheets set on the scanning unit 35 (S5). Specifically, the controller 11 instructs the MFP 30 to perform auto-crop scanning of the document sheets set on the scanning unit 35.

In response to the instruction for the auto-crop scanning, the controller 31 of the MFP 30 controls the scanning unit 35 to generate scanned data 70 that contains images of the document sheets set in the set positions (see FIGS. 8 and 9). After that, the controller 31 detects a document image 75 of each of the document sheets contained in the scanned data 70 generated. At this time, the controller 31 detects each of the document images 75 by implementing edge detection for document image boundaries 77. The document image boundaries 77 indicate boundaries of the document images 75. Then, the controller 31 extracts the detected document images 75 from the scanned data 70.

At this time, the controller 31 provides each of the document images 75 with image location information. The image location information includes the size of the scanned data 70 and information representing respective locations of the document images 75 in the scanned data 70.

In S6, the controller 11 acquires image data of each of the document images 75 contained in the scanned data 70 generated in S5 (S6). Namely, the controller 11 requests, from the MFP 30, the scanned data 70 generated in S5 (more specifically, the image data of each of the document images 75 contained in the scanned data 70). In response to receipt of the scanned data 70 (i.e., the image data of each of the document images 75 in the scanned data 70) from the MFP 30, the controller 11 stores the scanned data 70 onto the RAM 14.

In response to acceptance of the request for the scanned data 70, the controller 31 of the MFP 30 transmits the scanned data 70 generated in S5. Specifically, the controller 31 transmits, to the computer 10, the image data of each of the document images 75 and the image location information corresponding to each of the document images 75.

In S7, the controller 11 executes an image identification providing program (see FIG. 7) to provide an image identification to each of the document images 75 contained in the scanned data 70 acquired in S6 (S7).

The image identification providing program will be described in detail with reference to a flowchart in FIG. 7, which shows a procedure of the image identification providing program.

Initially, the controller 11 reads, out of the RAM 14, the scanned data 70 (i.e., the image data of each of the document images 75) acquired in S6 (S31). Then, based on the image location information of each of the document images 75, the controller 11 reproduces the location of each of the document images 75 in the scanned data 70.

It is noted that unlike the scanned data 70 as originally generated by the scanning unit 35, the scanned data 70 read out in S31 does not include any plane image corresponding to a blank space other than the document images 75. Namely, the scanned data 70 read out in S31 represents image data of each of the document images 75 and a positional relationship among the document images 75 in the scanned data 70 as originally generated.

Subsequently, the controller 11 determines whether the currently-set template data 50 is of the vertically-long document type (S32). Specifically, based on the format information of the template data 50, the controller 11 makes the determination of S32. When determining that the currently-set template data 50 is of the vertically-long document type (S32: Yes), the controller 11 goes to S35. Meanwhile, when determining that the currently-set template data 50 is not of the vertically-long document type (S32: No), the controller 11 goes to S33.

Initially, an explanation will be provided about steps (S33 and S34) to be executed when the template data 50 is of the horizontally-long document type, with reference to FIG. 8.

In S33, the controller 11 acquires image location coordinates 76 of each of the document images 75 (S33). To describe more concretely, the controller 11 firstly sets orthogonal coordinate system that has a scan origin 71 of the scanned data 70 (as originally generated) defined as an origin. The scan origin 71 represents an initial pixel acquired during document scanning by the scanning unit 35, and corresponds to a left upper point of the scanned data 70 in FIG. 8.

As illustrated in FIG. 8, the controller 11 sets the scan origin 71 as a calculation coordinate origin 72, and sets an X-axis and a Y-axis with respect to the calculation coordinate origin 72. The X-axis is a measure for defining a position relative to the calculation coordinate origin 72 in the horizontal direction (the right direction in FIG. 8). The Y-axis is a measure for defining a position relative to the calculation coordinate origin 72 in the vertical direction (the downward direction in FIG. 8).

Thereafter, based on the orthogonal coordinate system as set (see FIG. 8) and the positional information of each of the document images 75, the controller 11 acquires the image location coordinates 76 of each of the document images 75, and stores onto the RAM 14 information representing the image location coordinates 76 of each of the document images 75. It is noted that the image location coordinates 76 represent a left upper position of each of the document images 75 in the scanned data 70.

In S34, the controller 11 calculates an allocation reference distance L of each of the document images 75 (S34). Specifically, based on the orthogonal coordinate system shown in FIG. 8 and the image location coordinates 76, the controller 11 calculates the allocation reference distance L of each of the document images 75, and stores onto the RAM 14 the allocation reference distance L of each of the document images 75. It is noted that the allocation reference distance L represents a distance between the calculation coordinate origin 72 and the point of the image location coordinates 76 of a document image 75.

Subsequently, an explanation will be provided about steps (S35 to S37) to be executed when the template data 50 is of the vertically-long document type, referring to FIG. 9.

In S35, the controller 11 acquires image location coordinates 76 of each of the document images 75 (S35). Specifically, the controller 11 first sets an orthogonal coordinate system for the scanned data 70 in the same manner as S33. It is noted that the orthogonal coordinate system in this case is different from that set in S33.

To describe more concretely, in S35, the controller 11 sets the orthogonal coordinate system in which not the scan origin 71 but a left upper point of the scanned data 70 is defined as a calculation coordinate origin 72. In this case, an X-axis is set to extend upward from the calculation coordinate origin 72 (see FIG. 9). A Y-axis is set to extend rightward from the calculation coordinate origin 72. Namely, in S35, the controller 11 sets the orthogonal coordinate system in a state where the orthogonal coordinate system of S33 is rotated counterclockwise by an angle of 90 degrees.

Thereafter, based on the orthogonal coordinate system as set (see FIG. 9) and the positional information of each of the document images 75, the controller 11 acquires the image location coordinates 76 of each of the document images 75, and stores onto the RAM 14 information representing the image location coordinates 76 of each of the document images 75. It is noted that the image location coordinates 76 represent a left lower position of each of the document images 75 in the scanned data 70.

In S36, the controller 11 calculates an allocation reference distance L of each of the document images 75 (S36). Specifically, based on the orthogonal coordinate system shown in FIG. 9 and the image location coordinates 76, the controller 11 calculates the allocation reference distance L of each of the document images 75, and stores onto the RAM 14 the allocation reference distance L of each of the document images 75.

In S37, the controller 11 rotates the scanned data 70 clockwise by an angle of 90 degrees (S37). Specifically, the controller 11 rotates all of the document images 75 contained in the scanned data 70 clockwise by 90 degrees. Thereby, the orientation of the document images 75 is rendered identical to the orientation of the template data 50 of the vertically-long document type.

In S38, the controller 11 sets a value of a counter I to zero (S38). It is noted that the value of the counter I indicates the number of the document images 75 with the respective image identifications provided thereto.

In S39, the counter 11 determines whether the value of the counter I has become equal to the number of the document images N (S39). Namely, the controller 11 determines whether the image identification is provided to every document image 75 in the scanned data 70. When determining that the value of the counter I has become equal to the number of the document images N (S39: Yes), the controller 11 terminates the image identification providing program. Meanwhile, when determining that the value of the counter I has not yet become equal to the number of the document images N (S39: No), the controller 11 goes to S40.

In S40, the controller 11 specifies a target document image from the document images 75 contained in the scanned data 70. The target document image denotes a target one, of the document images 75, to which the image identification is to be provided.

Specifically, the controller 11 reads, out of the RAM 14, the allocation reference distances L of document images 75 to which the image identifications have not yet been provided, and identifies, as a target document image, a document image 75 associated with the shortest allocation reference distance L.

In the example shown in FIG. 8, a document image 75 of "landscape," which has the shortest allocation reference distance L, is specified as a target document image. Further, in the later-executed steps S40, the controller 11 sequentially identifies, as target document images, a document image 75 of "flower" and a document image 75 of "portrait" in the cited order based on the allocation reference distances L of the other document images 75. Additionally, in the example shown in FIG. 9 as well, the controller 11 sequentially identifies, as target document images, a document image 75 of "landscape," a document image 75 of "flower," and a document image 75 of "portrait" in the cited order based on the allocation reference distances L.

When there are a plurality of document images 75 that have an identical allocation reference distance L, the controller 11 identifies, as a target document image, one of the plural document images 75 that has the smallest X-coordinate of the image location coordinates 76. Further, when there are a plurality of document images 75 that have an identical allocation reference distance L and an identical X-coordinate of the image location coordinates 76, the controller 11 identifies, as a target document image, one of the plural document images 75 that has the smallest Y-coordinate of the image location coordinates 76.

In S41, the controller 11 provides the target document image with a corresponding image identification (S41). The image identifications are sequentially provided as identification numbers in the order from "1," in the same manner as the area identifications.

In the example shown in FIG. 8, in S41, the controller 11 provides the document image 75 of "landscape" with the image identification of "the identification number: 1." In the later-executed steps S41, the controller 11 provides the document image 75 of "flower" with the image identification of "the identification number: 2," and provides the document image of "portrait" with the image identification of "the identification number: 3." The length order of the allocation reference distances L in the example shown in FIG. 8 applies to the example shown in FIG. 9 as well. Therefore, in the example shown in FIG. 9, the controller 11 provides the document images 75 with the respective image identifications, in the same manner as the example shown in FIG. 8.

In S42, the controller 11 increments the value of the counter I by one (S42). Thereafter, the controller 11 provides unprocessed document images 75 with the respective image identifications.

Referring back to FIG. 2, after providing each of the document images 75 contained in the scanned data 70 with the image identification, the controller 11 goes to S8. In S8, the controller 11 determines whether the controller 11 has completely performed the processes of detecting every allocation area 55 in the template data 50 and detecting every document image 75 in the scanned data 70 (S8). When determining that the controller 11 has completely performed the processes of detecting every allocation area 55 in the template data 50 and detecting every document image 75 in the scanned data 70 (S8: Yes), the controller 11 advances to S9. Meanwhile, when determining that the controller 11 has not completely performed the processes of detecting every allocation area 55 in the template data 50 and detecting every document image 75 in the scanned data 70 (S8: No), the controller 11 goes back to S1.

In S9, the controller 11 determines whether the number of the document images N has become equal to the number of the allocation areas M (S9). When determining that the number of the document images N has become equal to the number of the allocation areas M (S9: Yes), the controller 11 goes to S10. Meanwhile, when determining that the number of the document images N has not yet become equal to the number of the allocation areas M (S9: No), the controller 11 goes to S16.

In S10, the controller 11 sets a value of a counter A to zero (S10). The value of the counter A denotes the number of the document images 75 allocated and combined in the respective allocation areas 55.

In S11, the controller 11 determines whether the value of the counter A has become equal to the number of the document images N (S11). Namely, the controller 11 determines whether every document image 75 is allocated and combined in a corresponding one of the allocation areas 55. When determining that the value of the counter A has become equal to the number of the document images N (S11: Yes), the controller 11 goes to S15. Meanwhile, when determining that the value of the counter A has not become equal to the number of the document images N (S11: No), the controller 11 goes to S12.

In S12, the controller 11 edits an object document image (S12). Specifically, the controller 11 first specifies, as an object document image, one of the document images 75 contained in the scanned data 70 that has the smallest one of the identification numbers for the image identifications. The object document image denotes a document image to be processed in S12 and S13.

Next, based on the image identification of the object document image and the area identification of each allocation area 55, the controller 11 specifies an allocation area 55, in the template data 50, which corresponds to the object document image. Specifically, the controller 11 identifies, as an allocation area 55 corresponding to the object document image, an allocation area 55 that has an identification number identical to an identification number of the object document image.

Then, the controller 11 reads, out of the RAM 14, the positional information of the allocation area 55 corresponding to the object document image. Thereafter, in accordance with the read positional information of the allocation area 55, the controller 11 edits the object document image. More specifically, the controller 11 edits the object document image in accordance with the size and the shape of the allocation area 55 corresponding to the object document image. The editing of the object document image includes enlarging, reducing, and trimming of the object document image.

In S13, the controller 11 combines the edited object document image to be allocated in the allocation area 55 corresponding to the object document image (S13).

Then, the controller 11 proceeds to S14, in which the controller 11 increments the value of the counter A by one (S14). Thereby, in the later-executed steps S12 and S13, the controller 11 edits a next object document image (e.g., a document image 75 of "the identification number: 2"), and combines the next object document image to be allocated in an allocation area 55 corresponding to the next object document image.

In S15 to be executed when the value of the counter A has become equal to the number of the document images N (S11: Yes), the controller 11 perform a printing operation (S15). At the time when the controller 11 advances to S15, the document images contained in the scanned data 70 are allocated and combined in the respective allocation areas 55 in the template data 50 (see FIG. 10). Namely, composite data 100 is completely generated before execution of S15.

Accordingly, in the printing operation (S15), the controller 11 transmits to the MFP 30 a print execution command along with the composite data 100, and terminates the control program. In response to receipt of the print execution command and the composite data 100, the controller 31 of the MFP 30 controls the printing unit 36 to print the composite data 100 on a sheet.

Thereby, the printing system 1 can obtain a printed output that has images of a plurality of document sheets formed thereon to be allocated in respective user-intended positions. Thus, when the user desires a printed output with images of a plurality of document sheets incorporated into respective user-intended positions, the printing system 1 can present the user-desired output, reducing a user's burden.

In S16 to be executed when the number of the document images N is not equal to the number of the allocation areas M (S9: No), the controller 11 performs an exceptional operation (S16). In the exceptional operation (S16), the controller 11 carries out, e.g., an operation of informing about an error caused due to a shortage of one or more document images. After that, the controller 11 terminates the control program.

As described above, the printing system 1 and the control program (see FIG. 2) of the first embodiment can read images of a plurality of document sheets in a single scanning operation and present a printed output that has the scanned images allocated in respective user-intended positions. At this time, the user needs not perform scanning for each of the document sheets. Therefore, the printing system 1 and the control program can reduce a user's burden.

Further, the printing system 1 and the control program display the document set guide screen 60 on the display unit 25 (see FIGS. 5 and 6). By referring to the information displayed on the document set guide screen 60, the user can grasp appropriate set positions of the document sheets relative to the flatbed. Consequently, the printing system 1 and the control program can certainly present an output printed in a user-desired fashion.

Further, the document set guide screen 60 includes the display orientation informing image 62, the template orientation informing images 63, and the set orientation informing images 64. By confirming the information 62 to 64 displayed on the document set guide screen 60, the user can grasp the relationship between the actual situation and the information displayed on the document set guide screen 60, and appropriate orientations of the document sheets to be set. Thus, the printing system 1 and the control program can more certainly present an output printed in a user-desired fashion.

In addition, the printing system 1 and the control program change the display manner in which the document set guide screen 60 is displayed (see FIGS. 5 and 6) and the operations (S32 to S37) to be applied for providing the image identifications, depending on the type of the template data 50 (the vertically-long document type or the horizontally-long document type). Thereby, the printing system 1 and the control program can present an output printed in a user-desired fashion regardless of whether the template data 50 is of the vertically-long document type or the horizontally-long document type.

Second Embodiment

Subsequently, an explanation will be provided about a second embodiment, in which one or more aspects of the present invention are applied to an MFP 30. A basic configuration of the MFP 30 in the second embodiment is the same as that of the MFP 30 in the first embodiment. Therefore, differences between the first and second embodiments will be set forth below.

In the second embodiment, the control program (see FIGS. 2, 3, and 7) is stored on a storage unit (e.g., the ROM 33) of the MFP 30. The control program is executed by the controller 31 of the MFP 30.

Further, the control program of the second embodiment is different from that of the first embodiment in operations of S3 to S6, and S7. The operations in the other steps in the second embodiment are the same as those in the first embodiment. Next, the differences between the first and the second embodiments will be described.

In S3, the controller 31 displays the document set guide screen 60 on the display panel 38. In this respect, except for that the document set guide screen 60 is displayed on the display panel 38, the operations of S3 are the same as those in the first embodiment.

In S4, the controller 31 determines, based on an operation of the keypad 39, whether a scan execution operation has been performed.

In S5, the controller 31 controls the scanning unit 35 to perform auto-crop scanning, without performing communication with the computer 10. The operations to be executed by the MFP 30 in S5 of the second embodiment are the same as those of the first embodiment, except for that S5 of the second embodiment is not executed in response to receipt of an external instruction to perform scanning.

In S6, the controller 31 stores onto the RAM 34 the scanned data generated in S5, without performing communication with the computer 10. In other respects, the operations to be executed in S6 of the second embodiment are the same as those of the first embodiment.

In S15, the controller 31 controls the printing unit 36 to print the composite data 100 stored on the RAM 34 on a sheet, without performing communication with the computer 10. The operations to be executed by the MFP 30 in S15 of the second embodiment are the same as those of the first embodiment, except for that S15 of the second embodiment is not executed in response to receipt of a print execution command and the composite data 100 from the computer 10.

The MFP 30 and the control program, configured as above in the second embodiment, can provide the same effects as the first embodiment. Namely, the MFP 30 and the control program can reduce a user's burden in obtaining a printed output that has images of a plurality of document sheets allocated in respective user-intended positions. Further, the MFP 30 and the control program can certainly present a printed output that has the images of the plurality of document sheets combined in a user-desired fashion.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiments, the composite data 100 is output in a manner printed on a sheet. However, the composite data 100 may be output in any other manner. For example, the composite data 100 may be faxed using the facsimile unit 37. Alternatively, the composite data 100 may be output and stored on an external storage device.

In the aforementioned embodiments, the template data 50 which the user creates is employed. However, a predetermined format of template data may be employed. In this case, since allocation areas are already determined in the template data, the steps S1 and S2 in FIG. 2 may be omitted. Consequently, it is possible to reduce a processing load to detect allocation areas.

In the aforementioned embodiments, each of the allocation areas 55 is shaped to be rectangular. However, the allocation areas 55 may be shaped in any other form such as an elliptical form. In this case, in S12, the document images 75 may be trimmed into respective shapes (e.g., elliptical shapes) corresponding to the allocation areas 55. Thus, it is possible to obtain composite data in which the document images 75 are allocated in a wide variety of fashions.

In the first embodiment, the MFP 30 performs auto-crop scanning and extracts each document image 75 from the scanned data 70. However, the MFP 30 may transmit the scanned data 70 to the computer 10 without extracting the document images 75, and the computer 10 may extract each document image 75 from the scanned data 70.

Furthermore, the document set guide screen 60 may not be displayed. The processing for the scanned data may not necessarily be performed after the processing for the template data 50. In other words, the processing for the template data 50 may be performed after the processing for the scanned data.

What is claimed is:

1. An image processing device configured to generate and output composite data in which two or more document images are combined, comprising:
    an area detecting unit configured to detect allocation areas from template data that defines the allocation areas where the document images are to be allocated on the composite data, respectively;
    an area position specifying unit configured to specify a position of each of the detected allocation areas with respect to a first standard for defining a position on the template data;
    an area identification providing unit configured to provide an area identification to each of the allocation areas based on the specified position of each of the allocation areas;
    an image acquiring unit configured to acquire image data based on document sheets set thereon on which the document images to be combined are formed;
    an image extracting unit configured to extract the document images from the acquired image data;
    an image location specifying unit configured to specify a location of each of the extracted document images with respect to a second standard for defining a location on the acquired image data;
    an image identification providing unit configured to provide an image identification to each of the document images based on the specified location of each of the document images;
    an allocation area identifying unit configured to identify an allocation area corresponding to each of the document images based on the image identifications and the area identifications;
    an image editing unit configured to edit each of the document images so as to be allocated in the corresponding one of the allocation areas that is identified by the allocation area identifying unit;
    a composite data generating unit configured to generate the composite data in which the edited document images are allocated in the respective allocation areas; and
    an output unit configured to output the composite data generated by the composite data generating unit.

2. The image processing device according to claim 1, further comprising a display unit configured to display set positions on the image acquiring unit where the document sheets are to be set, in association with the allocation areas of the template data.

3. The image processing device according to claim 2, further comprising a first display controller configured to control the display unit to additionally display a first orientation image for clarifying a relationship between an orientation of the display unit and orientations of the document sheets to be set.

4. The image processing device according to claim 2, further comprising a second display controller configured to control the display unit to additionally display a second orientation image for clarifying a relationship between an orientation of the display unit and an orientation of the template data.

5. The image processing device according to claim 1, further comprising:
    a first standard setting unit configured to set, as the first standard, a coordinate system with a predetermined point of the template data defined as an origin thereof;
    a template specifying unit configured to specify a type of the template data based on a format information of the template data;
    a second standard setting unit configured to set, as the second standard, a coordinate system with a predetermined point of the acquired image data defined as an origin thereof, depending on the specified type of the template data; and
    an image rotating unit configured to, when the template data is of such a type that an orientation of the template data is inconsistent with an orientation of each of the document images, rotate each of the document images to render the orientation of each of the document images consistent with the orientation of the template data.

6. The image processing device according to claim 5,
wherein the first standard setting unit is configured to set, as the first standard, the coordinate system with a left upper end of the template data defined as the origin thereof,
wherein the template specifying unit is configured to specify the type of the template data between a vertically-long document type and a horizontally-long document type, based on the format information of the template data,
wherein the second standard setting unit is configured to, when the template data is of the horizontally-long document type, set, as the second standard, the coordinate system with a left upper end of the acquired image data defined as the origin thereof,
wherein the second standard setting unit is configured to, when the template data is of the vertically-long document type, set, as the second standard, the coordinate system with a left lower end of the acquired image data defined as the origin thereof, and
wherein the image rotating unit is configured to, when the template data is of the vertically-long document type, rotate each of the document images clockwise by an angle of 90 degrees.

7. An image processing system configured to generate and output composite data in which two or more document images are combined, comprising:
an area detecting unit configured to detect allocation areas from template data that defines the allocation areas where the document images are to be allocated on the composite data, respectively;
an area position specifying unit configured to specify a position of each of the detected allocation areas with respect to a first standard for defining a position on the template data;
an area identification providing unit configured to provide an area identification to each of the allocation areas based on the specified position of each of the allocation areas;
an image acquiring unit configured to acquire image data based on document sheets set thereon on which the document images to be combined are formed;
an image extracting unit configured to extract the document images from the acquired image data;
an image location specifying unit configured to specify a location of each of the extracted document images with respect to a second standard for defining a location on the acquired image data;
an image identification providing unit configured to provide an image identification to each of the document images based on the specified location of each of the document images;
an allocation area identifying unit configured to identify an allocation area corresponding to each of the document images based on the image identifications and the area identifications;
an image editing unit configured to edit each of the document images so as to be allocated in the corresponding one of the allocation areas that is identified by the allocation area identifying unit;
a composite data generating unit configured to generate the composite data in which the edited document images are allocated in the respective allocation areas; and
an output unit configured to output the composite data generated by the composite data generating unit.

8. A non-transitory computer readable medium having computer readable instructions stored thereon for generating and outputting composite data in which two or more document images are combined, the instructions, when executed by a processor having an image acquiring unit, causing the processor to perform:
an area detecting step of detecting allocation areas from template data that defines the allocation areas where the document images are to be allocated on the composite data, respectively;
an area position specifying step of specifying a position of each of the detected allocation areas with respect to a first standard for defining a position on the template data;
an area identification providing step of providing an area identification to each of the allocation areas based on the specified position of each of the allocation areas;
an image acquiring step of acquiring image data based on document sheets set on the image acquiring unit, the document sheets having thereon the document images to be combined;
an image extracting step of extracting the document images from the acquired image data;
an image location specifying step of specifying a location of each of the extracted document images with respect to a second standard for defining a location on the acquired image data;
an image identification providing step of providing an image identification to each of the document images based on the specified location of each of the document images;
an allocation area identifying step of identifying an allocation area corresponding to each of the document images based on the image identifications and the area identifications;
an image editing step of editing each of the document images so as to be allocated in the corresponding one of the allocation areas that is identified in the allocation area identifying step;
a composite data generating step of generating the composite data in which the edited document images are allocated in the respective allocation areas; and
an output step of outputting the composite data generated in the composite data generating step.

9. The non-transitory computer readable medium according to claim 8,
wherein the processor further has a display unit, and
wherein the instructions cause the processor to further perform a display step of displaying, on the display unit, set positions on the image acquiring unit where the document sheets are to be set, in association with the allocation areas of the template data.

10. The non-transitory computer readable medium according to claim 9,
wherein the display step comprises a step of additionally displaying, on the display unit, a first orientation image for clarifying a relationship between an orientation of the display unit and orientations of the document sheets to be set.

11. The non-transitory computer readable medium according to claim 9,
wherein the display step comprises a step of additionally displaying, on the display unit, a second orientation image for clarifying a relationship between an orientation of the display unit and an orientation of the template data.

12. The non-transitory computer readable medium according to claim 8,
wherein the instructions cause the processor to further perform:
a first standard setting step of setting, as the first standard, a coordinate system with a predetermined point of the template data defined as an origin thereof;

a template specifying step of specifying a type of the template data based on a format information of the template data;

a second standard setting step of setting, as the second standard, a coordinate system with a predetermined point of the acquired image data defined as an origin thereof, depending on the specified type of the template data; and an image rotating step of, when the template data is of such a type that an orientation of the template data is inconsistent with an orientation of each of the document images, rotating each of the document images to render the orientation of each of the document images consistent with the orientation of the template data.

13. The non-transitory computer readable medium according to claim 12, wherein the first standard setting step comprises a step of setting, as the first standard, the coordinate system with a left upper end of the template data defined as the origin thereof, wherein the template specifying step comprises a step of specifying the type of the template data between a vertically-long document type and a horizontally-long document type, based on the format information of the template data, wherein the second standard setting step comprises a step of, when the template data is of the horizontally-long document type, setting, as the second standard, the coordinate system with a left upper end of the acquired image data defined as the origin thereof, wherein the second standard setting step comprises a step of when the template data is of the vertically-long document type, setting, as the second standard, the coordinate system with a left lower end of the acquired image data defined as the origin thereof, and wherein the image rotating step comprises a step of, when the template data is of the vertically-long document type, rotating each of the document images clockwise by an angle of 90 degrees.

* * * * *